United States Patent [19]

Ferguson

[11] 4,153,505

[45] May 8, 1979

[54] SORBENT MATERIALS

[75] Inventor: Alan N. Ferguson, Harlow, England

[73] Assignee: Minnesota Mining and Manufacturing Company, St. Paul, Minn.

[21] Appl. No.: 576,223

[22] Filed: May 9, 1975

[30] Foreign Application Priority Data

May 10, 1974 [GB] United Kingdom ............... 20868/74

[51] Int. Cl.$^2$ .............................................. D21H 3/48
[52] U.S. Cl. .................................. 162/164 R; 55/387; 55/528; 55/DIG. 13
[58] Field of Search ................ 162/164, 158; 210/502, 210/505, 39, 40, 111; 260/2.5 R, 2.5 HB; 55/387, 528, DIG. 13

[56] References Cited

U.S. PATENT DOCUMENTS 3,246,767  4/1946  Pall et al. ............................. 210/505

FOREIGN PATENT DOCUMENTS 231485  1/1960  Australia ................................... 210/502

OTHER PUBLICATIONS

"Studies on Nitroaniline–Sulfuric Acid Compositions: Aphrogenic Pyrostats", JAPS, vol. 11, pp. 2049–2064, 1970.

Primary Examiner—S. Leon Bashore
Assistant Examiner—William F. Smith
Attorney, Agent, or Firm—Cruzan Alexander; Donald M. Sell; Mark A. Litman

[57] ABSTRACT

A composite sorptive material in the form of a self-supporting, fluid-permeable sheet of fibrous material having distributed throughout a powdered sorbent material. The sheets provide a simple and convenient way of handling and using powdered sorbent materials. Suitable powdered sorbent materials include activated charcoal and powdered sorbent foam which has been prepared by the pyrolysis of an aromatic nitrogen-containing compound.

7 Claims, No Drawings

SORBENT MATERIALS

This invention relates to composite sorbent materials.

BACKGROUND OF THE INVENTION

We have found that a black sorbent thermoset foam can be prepared by the pyrolysis of a liquid composition comprising at least one aromatic nitrogen-containing compound. Such foams are described in our copending Patent Application Nos. 25181/73, and 25182/73 and are found to have excellent sorption for polar molecules. When prepared as described in these applications, the sorbent foams tend to be in the form of a fine black powder having a low bulk density. This can make it difficult to handle the foams and to retain them during their use as sorbents.

Similar problems can be experienced with active carbon and it has been the practice to blend active carbon particles with a binder and then to granulate and carbonise the mixture. In this way, hard attrition resistant granules can be prepared which can be easily handled and used without significant loss in the absorbtive capacity of the active carbon. Sorbent thermoset foams as described above cannot be granulated easily in this way without significant decrease in the valuable chemisorption capacity of the foams occuring during sintering.

It is, therefore, an object of this invention to provide a way of incorporating these sorbent thermoset foams into a carrier without substantial loss of the specific surface area and sorptive capacity of the foams.

SUMMARY OF THE INVENTION

According to the invention there is provided a composite sorptive material comprising a self-supporting, fluid-permeable sheet of fibrous material in which powdered black sorbent thermoset foam as described above is distributed throughout the sheet and retained in the sheet by the fibrous material.

As will be appreciated the sheets of the invention provide a simple and convenient way of handling and using the powdered sorbent materials such as the above foams without the disadvantage noted above.

The powdered sorbent material can for example be activated charcoal but is preferably a powdered sorbent foam which has been prepared by the pyrolysis of an aromatic nitrogen-containing compound.

The self-supporting sheet can be a water-laid sheet of fibres similar to paper or card and so can be made in a fashion analogous to such products, the foam powder being distributed throughout the sheet and being trapped in place by the fibres. The sheet will be gas permeable and so gases can readily come into contact with the particles of the sorbent foam. Therefore the specific surface area and sorptive capacity of the foam in the sheet can be substantially retained.

The sheet preferably has a relatively large fluid, and in particular gas, permeability so as to promote good contact between the foam particles and molecules to be sorbed from the fluid. Therefore the sheet is preferably more in the form of a relatively open and bulky network of fibres as in laboratory filter paper than in the form of the relatively tight and compact mass of fibres found in heavy glossy types of paper. Methods of making those relatively open fibrous material are well known in the paper-making art. According to one embodiment, a dispersion of fibres and powdered thermoset foam is made and a wet-laid or felted sheet is prepared by straining the mixture. On an industrial scale this can be effected on a fourdrinier paper-making machine in the well known manner for making paper materials. Often, however, it has been found to be desirable to use a higher proportion of water in the slurry which is strained than would otherwise be normal in the absence of the powder.

When the composite materials are in the form of a wet-laid sheet, the dispersion of the powder in water does not impair the sorbent properties of the powder to a significant degree.

The fibres for the self-supporting sheet are typically cellulose fibres of paper making length although the type of fibre is not critical.

Alternatively the materials of the invention can be similar to non-woven fabric sheet material such as felts. Methods of making such materials are well known in the fabric making art, such materials according to the invention also containing quantities of black foam powder.

The sorbent thermoset foams are incorporated into the fibre sheet in the form of a fine powder. The powder normally has particles ranging from a fine dust which is liable to be blown around by slight air currents, e.g. about 0.5 micrometer in diameter, to particles about 0.5 mm in diameter and particles of this size range are eminently suited for incorporation into the composite sheet materials of the invention. The particles become trapped or enmeshed in the network of fibres in the sheet and so retained in place.

The relative proportions of powder to fibres can vary over a wide range, e.g. from 1% by weight or even less to 50% by weight or even greater. In general, however, the larger the proportion of powder the greater the sorptive capacity of the resulting composite sheet.

The composite sorbent materials of the invention are much more convenient to handle than the powdered sorbent thermoset foams prepared as described in our above noted copending Patent Applications. There is no problem of the fine powder or dust being blown away and the sheet is capable of being used for a variety of purposes, particularly the sorption of polar molecules from gases.

The composite materials of the invention would normally be a grey colour because of the presence of the black powder. This can be masked, for example, by including in the materials a dye or pigment such as a black dye or pigment or alternatively the composite material sheet can be sandwiched between two fluid permeable and attractively coloured sheets.

As described in our above noted Applications, the sorbent thermoset foams are useful for sorbing gases and the composite sorbent materials of the invention afford a convenient manner of using these sorbent thermoset foams in, for example, gas masks and cooker hoods. Thus the composite sorbent materials of the invention when in sheet form are useful liners for boxes containing silver items such as silverware, photographs and archival documents, and in addition they can be included in containers to assist in controlling the atmosphere in such containers. The composite sorbent materials according to the invention are also useful in removing polar molecules from liquids provided the sheet materials are made so as to retain their form when wet.

The thermoset foams which are useful for incorporation in the composite materials of the invention are described in detail in our copending Patent Application Nos. 25181/73, and 25182/73, the full disclosures of which applications are herein incorporated.

As described in Application No. 25181/73 the black sorbent thermoset foams are prepared by pyrolysis of a liquid composition comprising at least one aromatic nitrogen-containing compound having the general formula:

X—AR—Y in which Ar represents an aromatic nucleus on which X and Y are substituents in conjugate relationship and which optionally carries additional substituents, X represents a substituent having a negative Hammett sigma constant and attached to the aromatic nucleus by a nitrogen, oxygen or sulphur atom, and Y represents a substituent having a positive Hammett sigma constant and attached to the aromatic nucleus by a nitrogen atom, the substituents X and/or Y optionally forming part of a ring fused onto the aromatic nucleus, the thermoset foam having a specific surface area of at least 50 m$^2$/g, and/or the thermoset foams being non-carcinogenic or otherwise toxic to humans and substantially free from low molecular weight fusible toxic components and so capable of being safely handled by man.

As described in Application No. 25182/73 the black sorbent foam can have a very high specific surface area and can be prepared by pyrolysing a mixture of at least one aromatic nitrogen-containing compound having the general formula:

X—AR—Y in which Ar represents an aromatic nucleus in which X and Y are substituents in conjugate relationship and which optionally carries additional substituents, X represents a substituent having a negative Hamett sigma constant and attached to the aromatic nucleus by a nitrogen, oxygen or sulphur atom, and Y represents a substituent having a positive Hammett sigma constant and attached to the aromatic nucleus by a nitrogen atom, the substituents X and/or Y optionally forming part of a ring fused onto the aromatic nucleus, and which is liquid under the pyrolysis conditions and at least one Lewis acid metallic salt, and removing the Lewis acid metallic salt from the material resulting from the pyrolysis.

The black sorbent foam can be prepared by allowing a liquid mixture of at least one aromatic amine and sufficient concentrated nitric acid to react at elevated temperatures to give initially the evolution of nitrogen oxides followed by a pyrolysis reaction to give an expanded solid which is a black sorbent cross-linked thermoset foam insoluble in organic solvents.

All these black sorbent thermoset foams are believed to have a poly-quinoxaline structure and so it appears that they have the general repeating structure:

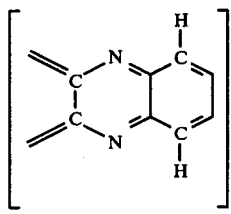

with cross-linking between the chains of these repeating fused aromatic rings, the positions of the cross-links being from the carbon atoms to which the hydrogen atoms are attached after removal of the latter. This structure makes the thermoset foam very stable both to heat and oxidation. Thus a piece of the foam can be held in a flame and, while it will glow and gradually burn away, it will stop buring immediately it is removed from the flame and it is not apparently decomposed by this treatment. This structure is consistent with the black colour of the foam and with the elementary analysis of the foam which gives a nitrogen content in the range of about 6 to 20%.

In this foam structure it appears that the nitrogen atoms impart the chemisorption properties. In addition to this, the foam may, depending upon its manner of preparation, contain some functional groups.

The aromatic nitrogen-containing compound is pyrolysed by heating it to a relatively low temperature, e.g. around 200° C., but once pyrolysis starts, an exothermic reaction occurs and it appears that the temperature of the overall mass may increase to a temperature of the order of 300° C. Within this mass there may be, however, localised regions where the temperature is much higher. Once the exothermic reaction starts no further external heating is required, the heating to pyrolysis temperature being merely to initiate the reaction.

When reaction occurs there is a quite sudden and large expansion to give a sponge of the thermoset foam which may have an apparent volume many hundreds of times the initial volume. Therefore, unless careful steps are taken to ensure that the pyrolysis temperature is maintained or the thermoset foam is purified, the foam will contain unreacted material and low molecular weight condensed fusible species which are carcinogenic or otherwise toxic to humans if the foam is handled.

In order to ensure that the thermoset foam be non-carcinogenic or otherwise non-toxic, it must contain no more than traces of the starting material or low molecular weight fusible species, e.g. no more than 0.001% by weight of either, and even residual traces such as these are usually included within the body of the foam and therefore precluded from contact when the foam is handled. Such non-carcinogenic foams can be prepared in the pure state if substantially complete pyrolysis is ensured by enclosing the material during reaction so that in spite of the sudden and large increase in apparent volume the reacting material is maintained at the pyrolysis temperature after formation, or by exhaustively purifying it as prepared with dilute acids, water, dilute bases, water and organic solvents. If required one can both exhaustively purify and reheat the thermoset foam to at least its pyrolysis temperature.

The black thermoset foams are prepared by pyrolysis of a liquid composition to give the solid foam and not by charring of a carbonaceous solid to give a solid char. Thus, the pore structure of the foams is formed during the pyrolysis reaction and is not already present in the material being pyrolysed. In effect a condensation reaction appears to occur during the pyrolysis and so the aromatic nitrogen-containing compound should have a structure which readily condenses or the liquid mixture which is pyrolysed should contain in addition to the aromatic nitrogen-containing compound one or more compounds which promote the condensation of the aromatic nitrogen-containing compound, e.g. because they are dehydrating agents for and/or co-condense with, the aromatic nitrogen-containing compound.

In the cases of the foams prepared according to Application Nos. 25181/73 and 25182/73 there are a large number of ways in which liquid composition containing the aromatic nitrogen-containing compound can be pyrolysed. Thus an aromatic nitrogen-containing compound which is liquid at the pyrolysis temperature, can be pyrolysed on its own or in admixture with other components to give a liquid mixture at the pyrolysis temperature, i.e. a mixture which is composed of liquid components or a solution of one or more of the components in the other or others. These other components are, as noted above, chosen to promote the condensation of the aromatic nitrogen-containing compound. As noted above one groups of compounds which promote this condensation are believed to be dehydrating agents for the aromatic nitrogen-containing compound and examples are strong mineral or organic acids and strong bases, while another group of compounds are those which will co-condense with the aromatic nitrogen-containing compound and assist in forming cross-links in the foam structure since we believe this tends to define the desired pore structure in the thermoset foams of the invention at an early stage in the pyrolysis of the aromatic nitrogen-containing compounds.

Examples of suitable strong acids are mineral acids such as sulphuric acid and phosphoric acid and organic acids such as methane sulphonic acid or fluorinated methane sulphonic acid.

Examples of strong bases are the mineral bases such as sodium and potassium hydroxide. One can of course employ latent acids, i.e. compounds which readily decompose on heating to give strong acids and examples are $CH_3CBr_3$ and amine salts of strong acids such as $(CH_3)_3NSO_3$.

The aromatic nitrogen-containing compound can also be pyrolysed in admixture with an organic acid such as oxalic acid or adipic acid which appears to co-condense with the aromatic nitrogen-containing compound and may in some instances give foams of increased specific surface area. When they are used however, it appears to be desirable additionally to include a strong acid in the liquid mixture which is pyrolysed.

The aromatic nitrogen-containing compound can further be pyrolysed in admixture with a soluble salt, preferably in the additional presence of a strong acid or base and examples of suitable soluble salts are sodium sulphate, sodium chloride, sodium bisulphate and primary sodium phosphate. It is believed that these soluble salts act rather like a filler forming layers or pores between condensed reacted molecules during the pyrolysis to assist in defining the structures required in a molecular scale. Thereafter, removal of these salts, e.g. by leaching leaves the required pore structure.

The aromatic nitrogen-containing compound can be pyrolysed with a Lewis acid metallic salt as described in Application No. 25182/73 when foams of specific surface area of over 100 $m^2/g$ and often as high as 900 $m^2/g$ or even higher can be prepared.

We believe that the Lewis acid metallic salts should be capable of coordinating with amine groups and examples include aluminium chloride and ferric chloride, and the more expensive boron trifluoride, silicon tetrachloride, titanium tetrachloride, tin tetrachloride, and germanium tetrachloride. The preferred Lewis acid metallic salt is, however, zinc chloride which currently appears to give the highest specific surface areas.

Although we are not certain we believe that the Lewis acid metallic salt may also rather act like a filler forming layers between condensed reacted molecules during the pyrolysis to assist in defining the foam structure required on a molecular scale. Thereafter removal of the salt leaves the required pores giving the thermoset foams of the invention their high specific surface areas. In addition the Lewis acid metallic salts may have a corrosive action upon the thermoset foams so forming additional voids or pores.

When the mixture of aromatic nitrogen-containing compound and Lewis acid metallic salt is heated to pyrolysis temperature, a sudden and vigorous reaction occurs with the formation of a voluminous black sponge of the foam. These sponges are then crushed to give a powder which destroys the large voids in the sponges and the Lewis acid metallic salt leached or otherwise removed from the powder or sponge to leave a black thermoset foam having a microporous structure. The removal of the Lewis acid metallic salts can be readily achieved by washing the foam with dilute acid followed by water. In addition the foam can thereafter be exhaustively purified by washing with a dilute base, water and an organic solvent.

The pyrolysis can be effected by heating the reaction mixture to a relatively low temperature, e.g. around 200° C., but once pyrolysis starts, an exothermic reaction occurs as described above.

The specific surface area of foams used in the composite sorptive materials according to the invention depends upon the aromatic nitrogen-containing compound or mixture of that compound and other components but in cases other than those described in Application No. 25182/73 until after the Lewis acid metallic salt catalyst has been removed from the foam, the specific surface area can be increased by further pyrolysis e.g. at temperatures of 300° to 800° C., of the thermoset foam under a controlled atmosphere, e.g. a nitrogen atmosphere, which may be saturated with steam. During this further pyrolysis weight loss occurs but specific surface area increases.

The larger the surface area the larger the quantity of material which can be sorbed. Thus, the pure non-carcinogenic and non-toxic thermoset foam preferably has a specific surface area of at least 50 $m^2/g$ and the specific surface area of the foams can be at least 200 $m^2/g$ and as high as 900 $m^2/g$.

The large and sudden increase in volume which occurs upon pyrolysis to give the thermoset foam occurs as a result of the release of steam and other volatile materials during the reaction. The result is a sponge having large voids. These do not contribute significantly to the specific surface area, which is a measure of the microporous structure of the foams. This specific surface area can be measured by standard BET methods as described in Brunauer, Emmett and Teller in the Journal of the American Chemical Society, 60 page 309 (1938). We believe that it is in the pores of this microporous thermoset foam that polar molecules are chemically sorbed and so the higher the specific surface area the larger the sorptive capacity of the foam.

The aromatic nitrogen-containing material can be any aromatic compound containing a nitrogen atom as part of a substituent of the aromatic structure or containing nitrogen atoms both as part of the aromatic structure and as part of a substituent on the aromatic structure. It appears that the aromatic nitrogen-containing compound should be one which contains at least one nitro-group together with an amino and/or hydroxy group and for other groups such as:

 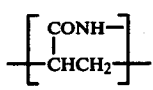

Such compounds include heterocyclic aromatic compounds containing additional nitrogen atoms within the aromatic rings and multicyclic aromatic compounds. It is preferred that the amino or hydroxy group be in the ortho or para positions relative to the nitro group.

Examples of aromatic nitrogen-containing compounds which we have found can be pyrolysed are:
3-nitroacetanilide,
4-nitroacetanilide,
2-nitroaniline,
4-nitroaniline,
amino-nitro-toluenes,
amino-nitro-xylene,
2,6-dibromo-4-nitroaniline,
2,6-dichloro-4-nitroaniline,
4-nitrophenylhydrazine,
bis-(2-nitrophenyl urea),
nitronaphthyl amines having vacant positions ortho to the nitro and amino-groups such as 5-nitro-1-naphthylamine,
5-nitroindoline,
2-chloro-4-nitroaniline,
2-methyl-4-nitroaniline,
5-amino-2-nitrobenzoic acid,
2-amino-4-nitrophenol,
3-methyl-4-nitrophenol,
2-amino-7-nitrofluorene,
4-nitrosophenol,
4-nitrophenol,
4-methylaminonitrobenzene,
4-dimethylaminonitrobenzene,
nitrated coal tar residues containing multicyclic compounds, the polymeric compound 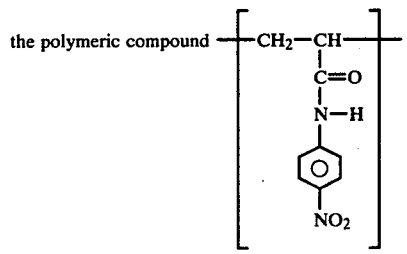

2-amino-5-nitropyridine, the compound 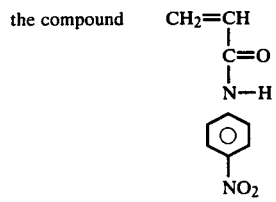

the compound 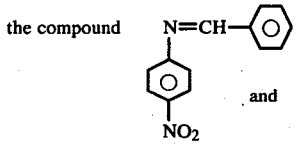 and the compound 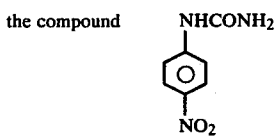

Examples of aromatic amines which we have found can be reacted with concentrated nitric acid to give foams according to the invention are:
aniline,
N-methylaniline,
p-anisidine,
p-toluidine,
o-anisidine,
o-toluidine,
N,N-dimethyl-aniline,
N,N-dimethyl-p-toluidine,
diphenylamine,
triphenylamine,
N-benzyl-aniline,
N-benzyl-N-ethyl-aniline,
3-chloroaniline,
coal tar pitch, and
oil distillation residues.

It is preferred that a mixture of aromatic nitrogen-containing compound and an acid such as sulphuric acid or phosphoric acid or a mixture of an organic acid such as oxalic acid with a mineral acid, or a mixture of a strong acid and an excess of salt such as sodium sulphate, or a strong base such as sodium hydroxide or potassium hydroxide or a mixture of it with a Lewis acid metallic salt, by pyrolysed. When these mixtures are slowly brought up to the pyrolysis temperature a homogenous solution forms. Then suddenly the vigorous reaction occurs with copious evolution of gases, believed to be mainly steam, and a voluminous black sponge of the thermoset foam is formed.

This manner of preparation often tends to give thermoset foams which have, as prepared, relatively low specific surface areas, e.g. when pyrolysis is effected in the presence of sulphuric acid, but which can be given increased specific surface areas, by, for example, further pyrolysis as noted above. When the pyrolysis is effected in the presence of phosphoric acid the foams often have quite high specific surface areas.

Once the voluminous black sponge has been formed it is crushed to give a powder of the thermoset foam. This destroys the large voids in the sponge but retains the specific surface area which is constituted by the microporous structure of the foam. Where a salt such as a Lewis acid metallic salt is present this must be removed before the microporous structure of the foam is obtained. The foam powder can then be used or alternatively first treated to purify it from carcinogenic materials or other toxic components or simply to increase its specific surface area.

To purify the thermoset foam, it can be powdered and the powder washed successively with an acid, e.g. dilute HCl, or base e.g. dilute NaOH, and an organic solvent such as acetone. Between each washing the powder can be recovered by filtration and washed with water. In this way all traces of starting materials and low molecular weight fusible species can be removed. Alternatively, or in addition, the thermoset foam powder can be further pyrolysed under higher temperatures, e.g. 400° C., and an inert atmosphere, e.g. a nitrogen atmosphere. This also tends to increase the specific surface area of the foam.

All these ways of preparing sorbent thermoset foams tend to give the powders which as noted above can readily be incorporated into the composite sorbent materials of the invention.

EXAMPLES OF THE INVENTION

The invention will now be illustrated by the following Examples of the preparation of composite sorbent materials.

EXAMPLE 1

20 g of a soft, loose paper was cut into 3 inch wide strips and stirred in water until the fibres had separated. 10 g of a powdered sorbent foam prepared as in Example 1 of our copending Patent Application No. 25182/73 were added and the mixture stirred until intimate mixing had taken place. The mixture was then quickly poured through a fine mesh sieve and the resultant cake was rolled with a metal roller to flatten and partially dry it to give a paper sheet containing the powdered sorbent foam. The paper was then dried in an oven at 80° C.

EXAMPLE 2

The procedure of Example 1 was repeated except that 10 g of paper and 10 g of foam were mixed. A similar sorbent paper was given.

EXAMPLE 3

150 g of Whatmas "ordinary clippings" filter paper, and 150 g of cellulose wadding were stirred together in 40 l of water for 30 minutes after which time the fibres had separated. 50 g of sorbent foam prepared as described in Example 1 of our copending Patent Application No. 25182/73 were ground through a 30 mesh sieve into the agitated liquors, and stirring continued for 30 minutes. The mixture was then diluted with water to 100 l and agitated gently.

Sheets of paper were formed by immersing a sieve or strainer formed of stainless steel mesh with wooden sides 57 cm long × 34 cm wide × 4½ cm deep, raising the sieve vertically and allowing the entrapped water to drain while shaking gently. Excess water was removed from the sheet by covering with a flexible plastic film and pressing well. The sieve was then inverted, and the sheet of paper removed and dried at approximately 60° C. in a photographic print dryer. When dry the sheet weighed approximately 25 g and had an appearance resembling a thin sheet of card.

The specific surface areas and hydrogen sulphide uptakes of the paper prepared as described in this Example were tested and compared with the values for the thermoset sorbent foam on its own and paper prepared as in this Example but without the addition of powdered foam and the results are listed below in Table I.

TABLE I

|  | $H_2S$ uptake (milli-moles. $g^{-1}$) | Specific surface area $m^2g^{-1}$ |
|---|---|---|
| paper without addition of powdered foam | 0.0 | 9.1 |
| paper prepared in Example 3 | 0.52 | 56.6 |
| powdered foam | 4.2 | 400 |

As can be seen from these results a substantial proportion of the specific surface area of the powdered foam was still available for chemisorption in the paper composites of the present invention which can be handled and used far more readily than the powdered foam.

EXAMPLE 4

The procedure of Example 3 was repeated with the addition of 10% by weight of Monastral Blue pigment to the white pulp. The result was a powder blue coloured paper which had a more attractive appearance than the grey coloured paper prepared in the previous examples.

It was also found that more attractive and satisfactory sorbent materials could be formed by sandwiching paper prepared as in Example 3 between layers of paper prepared as in Example 4 above and including a pigment but not including the thermoset foam.

EXAMPLE 5

A number of different samples of paper containing varying amounts of sorbent foam (prepared as described in Example 1 of our copending Patent Application No. 25182/73) dye and other conventional paper-making additives were prepared using different types of commercially available wood pulp. The general procedure was similar to that of Example 3 except that wood pulps were used in place of the filter paper clippings and cellulose wadding.

The $H_2S$ uptakes (measured as millimoles of $H_2S$ per gram of the final paper) of the resulting papers were measured and all the results are given in the following Table II.

In this Table the various starting paper pulps are identified as follows:
SWK: Soft wood kraft by Dryden
GW: Ground wood
RP: Refined pulp
URP: Unrefined pulp, The amount, if any, of a cationic retention acid (CP 7) is given in parts per million (p.p.m.) of the pulp slurry, this being a conventional additive in paper making to reduce "dusting" by fillers in the paper sheet, the presence or absence of dye is indicated by + or −, respectively, the dye is used being Imperial Jet Black available from Hercules Co., it being present, if used, at about 15% by weight of the pulp and when the dye was present its weight is included in the weight of wood pulp when listing the ratio of pulp to sorbent foam.

TABLE II

| Weight ratio pulp/ sorbent foam | % by weight of sorbent foam | Pulp type | Dye | CP7 ppm | $H_2S$ uptake |
|---|---|---|---|---|---|
| 100:0 | 0 | SWK | − | 0 | 0.15 |
|  |  |  | + | 0 | 0.26 |
|  |  | GW | − | 0 | 0.08 |
|  |  |  | + | 0 | 0.08 |
|  |  | SWK | + | 0 | 0.665 |

TABLE II-continued

| Weight ratio pulp/ sorbent foam | % by weight of sorbent foam | Pulp type | Dye | CP7 ppm | H2S uptake |
|---|---|---|---|---|---|
| 9:1 | 10 | | + | 0.3 | 0.416 |
| | | GW | + | 0 | 0.564 |
| | | | + | 0.25 | 0.546 |
| | | GW + SWK (1:1) | + | 0 | 0.62 |
| | | | + | 0.25 | 0.60 |
| | | SWK | + | 0 | 0.926 |
| | | | + | 0.25 | 0.866 |
| 8:2 | 20 | | | | |
| | | GW | + | 0 | 0.926 |
| | | | − | 0.1 | 0.97 |
| | | SWK | − | 0 | 1.59 |
| | | | − | 2.0 | 1.54 |
| | | GW | − | 0.1 | 1.39 |
| | | | − | 0.2 | 1.31 |
| 2:1 | 33 | | + | 0.05 | 1.69 |
| | | | + | 0.1 | 1.35 |
| | | GW + SWK (1:1) | + | 0 | 1.39 |
| | | URF | + | 0 | 1.69 |
| | | | + | 0.25 | 1.37 |
| | | RF | − | 0 | 1.41 |
| | | | − | 0.25 | 1.34 |
| 2:1 | 33 | | − | 2.0 | 1.55 |
| | | | − | 6.0 | 1.67 |
| | | | − | 10.0 | 1.44 |
| | | | − | 15.0 | 1.45 |
| | | | − | 20.0 | 1.34 |

As can be seen from these results, in general the larger the proportion of thermoset sorbent foam the larger the H2S uptake. In addition it can be seen that in the absence of the sorbent foam, the paper possibly plus dye had only a very small H2S uptake.

EXAMPLE 6

6.8 pounds of a thermoset sorbent foam made as described in Example 1 of our copending Patent Application 25182/73 and having a surface area of 1000 m²/g, and 14 pounds of Prince George semi-bleached Kraft pulp of soft wood origin and containing Jack Pine, were mixed and refined in 100 gallons of water to 80 seconds Williams freeness (a measure of water retention, which is in turn an indication of the fibrous nature of the pulp surface—increasing with beating, it is the time in seconds for 1 l of water containing 0.3 g pulp to drain through a special pulp retaining screen).

A further 6.8 pounds of the sorbent foam were added to the pulp slurry and the mixture then fed to the Fourdrinier stock inlet. The machine was operated at 14 feet per minute with the stock heated to 165° F. to help drainage on the screen. The ream weight of the resulting paper (the weight in pound of 2880 square feet of paper) varied from 55 to 81 pounds. The H2S uptake of the paper was measured and found to be 1.125 mM H2S per gram of paper.

EXAMPLE 7

15 pounds of Imperial Jet Black pigment and 200 pounds (dry weight) of a Dryden semi-bleached Kraft pulp of soft wood origin and not containing Jack Pine were suspended in 500 gallons of water and refined to 75 seconds Williams freeness.

The pigmented pulp was collected as a wet lap on the wet press of a Fourdrinier paper making machine before being reslurried in 300 gallons of water. 26.6 pounds of a sorbent thermoset foam prepared as described in Example 1 of our copending Patent Application No. 25182/73 and having a surface area of 733 m²/g were dispersed in the slurry, so giving 80 pounds of pulp to 22 pounds of foam (on a dry basis). The pH of the slurry was adjusted to 7.0 by the addition of soda ash and then paper was made from the slurry using the Fourdrinier paper making machine. This was run at 31 to 35 feet per minute with the head box vat at 140° F. An additional 7.5 pounds of Aqua Black pigment was added directly to the slurry stock towards the end of the run to restore the pigment concentration to approximately the initial value.

Some of the paper was produced crêped using a standard Fourdrinier crêping blade, the resulting paper having 10 to 15% stretch.

The ream weight of the resulting papers varied from 40 to 50 pounds.

The H2S uptakes of the papers were measured and found to be 0.975 mM H2S per gram for the crêpe paper and 1.015 mM H2S per gram for the non-crêped paper.

The papers prepared according to these Examples were found to be capable of inhibiting the growth of sulphide tarnish on silver in the manners described in our copending Patent Application No. 260/74, e.g. by lining the containers for silver articles with the paper.

What I claim is:

1. A composite sorbtive material comprising a self-supporting, fluid permeable sheet of fibrous material in which a powdered sorbent black thermoset foam has been distributed throughout the sheet and retained in the sheet by the fibrous material, said foam having been prepared by the pyrolysis of a composition liquid at the pyrolysis temperature comprising at least one aromatic nitrogen-containing compound having the general formula:

$$X-Ar-Y$$

in which Ar represents an aromatic nucleus, X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or attached directly to the aromatic nucleus, the thermoset foam having a specific surface area of at least 50 m²/g, and said pyrolysis comprising heating said composition to a temperature below 300° C. to initiate reaction of the said composition.

2. A material as claimed in claim 1 in which the sorbtive material has been made by allowing a liquid mixture of at least one aromatic amine and sufficient concentrated nitric acid to react at elevated temperatures to give initially the evolution of nitrogen oxides followed by a pyrolysis reaction to give an expanded solid which is black sorbent cross-linked thermoset foam insoluble in organic solvents.

3. A material as claimed in claim 1 in which the foam is in the form of a fine powder whose particles range from 0.5 micrometers in diameter to 0.5 millimeters in diameter.

4. A material as claimed in claim 1 in which the relative proportions of powder to fibers is from 1 to 50% by weight 5. A material as claimed in claim 1 in which the sheet is a water-laid sheet of fibers.

6. A material as claimed in claim 5 in which the fibers are cellulose fibers of paper making length.

7. The composite material of claim 1 wherein said foam was prepared with at least one Lewis acid metal salt in combination with said aromatic nitrogen-containing compound, and the Lewis acid metallic salt was removed from the material resulting from said pyrolysis.

* * * * *